(12) United States Patent
Du et al.

(10) Patent No.: US 12,494,326 B2
(45) Date of Patent: Dec. 9, 2025

(54) COMPOSITION FOR ELECTROLYTIC CAPACITOR AND ELECTROLYTIC CAPACITOR INCLUDING THE SAME

(71) Applicant: Industrial Technology Research Institute, Hsinchu (TW)

(72) Inventors: Yi-Chang Du, Taoyuan (TW); Jenn-Yeu Hwang, Hsinchu County (TW); Li-Duan Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 651 days.

(21) Appl. No.: 17/959,304

(22) Filed: Oct. 4, 2022

(65) Prior Publication Data

US 2023/0107749 A1    Apr. 6, 2023

Related U.S. Application Data

(60) Provisional application No. 63/251,703, filed on Oct. 4, 2021.

(51) Int. Cl.
| | | |
|---|---|---|
| *H01G 9/035* | (2006.01) | |
| *H01G 9/022* | (2006.01) | |
| *H01G 9/145* | (2006.01) | |

(52) U.S. Cl.
CPC ............. *H01G 9/035* (2013.01); *H01G 9/022* (2013.01); *H01G 9/145* (2013.01)

(58) Field of Classification Search
CPC ......... H10G 9/035; H10G 9/145; H10G 9/022
See application file for complete search history.

(56) References Cited

U.S. PATENT DOCUMENTS

| | | |
|---|---|---|
| 4,780,796 A | 10/1988 | Fukuda et al. |
| 4,910,645 A | 3/1990 | Jonas et al. |
| 8,339,770 B2 | 12/2012 | Yoshida et al. |
| 10,377,908 B2 | 8/2019 | Matsubayashi et al. |
| 10,563,071 B2 | 2/2020 | Tagawa et al. |
| 2018/0334577 A1* | 11/2018 | Matsubayashi ........ H01G 9/048 |

FOREIGN PATENT DOCUMENTS

| | | |
|---|---|---|
| CN | 103500660 | 1/2014 |
| JP | 2005/327566 | * 11/2005 |
| TW | 201719697 | 6/2017 |
| TW | I597313 | 9/2017 |

OTHER PUBLICATIONS

"Office Action of Taiwan Counterpart Application", issued on Jul. 5, 2023, p. 1-p. 5.

* cited by examiner

*Primary Examiner* — C Melissa Koslow
(74) *Attorney, Agent, or Firm* — JCIPRNET

(57) ABSTRACT

A composition for an electrolytic capacitor and an electrolytic capacitor including the composition is provided. The composition includes an intrinsically conductive polymer and an electrolyte solution. The electrolyte solution includes an organic solvent, an ionic salt compound and a succinimide-based compound.

11 Claims, 1 Drawing Sheet

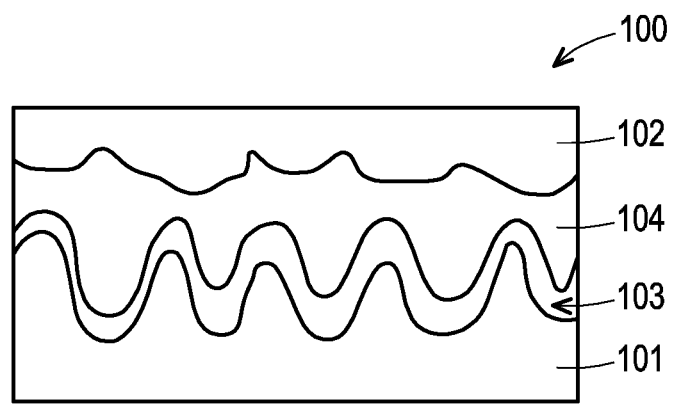

COMPOSITION FOR ELECTROLYTIC CAPACITOR AND ELECTROLYTIC CAPACITOR INCLUDING THE SAME

CROSS-REFERENCE TO RELATED APPLICATION

This application claims the priority benefit of U.S. provisional application Ser. No. 63/251,703, filed on Oct. 4, 2021. The entirety of the above-mentioned patent application is hereby incorporated by reference herein and made a part of this specification.

BACKGROUND

Technical Field

The disclosure relates to a composition for an electrolytic capacitor and an electrolytic capacitor including the composition.

Description of Related Art

Over time, improving the conductivity of electrolytes has been a major issue in the development of electrolytic capacitors. Electrolytes with high conductivity can reduce the equivalent series resistance of capacitors and attain properties of high frequency, low impedance, and high reliability. Compared to liquid electrolytes or solid organic semiconductor zirconium salts applied in conventional electrolytic capacitors, conductive polymers have higher conductivity and moderate high-temperature insulation properties, so the conductive polymers have become a trendy development of solid electrolytes used in electrolytic capacitors nowadays. The search for electrolyte solutions that allow conductive polymers to exert better performance is still ongoing.

SUMMARY

In view of this, the disclosure provides a composition for an electrolytic capacitor, which can solve the problem of which the equivalent series resistance (ESR) impedance of an electrolytic capacitor using a conductive polymer is too high.

The disclosure provides a composition for an electrolytic capacitor, which includes an intrinsically conductive polymer and an electrolyte solution. The electrolyte solution includes an organic solvent, an ionic salt compound, and a succinimide-based compound.

The disclosure further provides an electrolytic capacitor, which includes a positive electrode; a dielectric layer disposed on the positive electrode; a negative electrode; an electrolyte located between the dielectric layer and the negative electrode; and the composition for the electrolytic capacitor.

In order to make the features and advantages of the disclosure comprehensible, embodiments accompanied with drawings are described in detail below.

BRIEF DESCRIPTION OF THE DRAWING

FIG. 1 is a schematic view of a capacitor according to an embodiment of the disclosure.

DESCRIPTION OF THE EMBODIMENTS

An embodiment of the disclosure provides a composition for an electrolytic capacitor, which includes an intrinsically conductive polymer and an electrolyte solution. The electrolyte solution includes an organic solvent, an ionic salt compound, and a succinimide-based compound.

Intrinsically Conductive Polymer

The intrinsically conductive polymer of the disclosure may include polythiophene, polypyrrole, poly(p-phenylene vinylene), polyphenylene sulfide or polyaniline, and derivatives thereof. For example, poly(3,4-alkylenedioxythiophene), poly(3,4-ethylenedioxythiophene) (PEDOT), poly(3,4-propylenedioxythiophene) (PProDOT), poly(Thieno[3,4-b]-1,4-dioxin-2-methanol)) or a copolymer containing the above structure, such as PEDOT-co-polyethylene glycol, or admixtures, such as poly(3,4-ethylenedioxythiophene)-poly(vinylpyrrolidone) admixtures, poly(3,4-ethylenedioxythiophene)-polyethylene glycol admixture, and poly(3,4-ethylenedioxythiophene)-polyvinyl alcohol admixtures.

For the intrinsically conductive polymer in the conductive polymer composite material to come with good conductivity, the intrinsically conductive polymer in the doped state may be adopted. The dopant may include a sulfonic acid compound, such as methanesulfonic acid, benzenesulfonic acid, or p-toluenesulfonic acid; sulfonic acid polymer, such as poly(styrene sulfonic acid) (PSS), sulfonated polyether ether ketone or its copolymers, such as polystyrenesulfonic acid-co-poly(vinylpyrrolidone), polystyrenesulfonic acid-co-polyethylene glycol; carboxylic acid compounds; such as benzoic acid, phthalic acid, or succinic acid; carboxylic acid polymers, such as polyacrylic acid or its copolymer; amino acid, such as glycine; phosphate compounds, such as phosphoric acid, etidronic acid, diphenyl phosphate; derivatives thereof or a combination thereof.

The doping method of the intrinsically conductive polymer may be: the intrinsically conductive polymer is first polymerized into a conjugated polymer and then a dopant is added for doping; a dopant is added during the polymerization of the intrinsically conductive polymer; or by-products which are generated when an oxidant is used to initiate the polymerization of conjugated polymers serve as dopants for doping. For example, when a conjugated polymer is polymerized with iron p-toluenesulfonate, the generated p-toluenesulfonic acid may serve as a dopant. The amount of the dopant of the disclosure is not particularly limited. In some embodiments, with the dopant, in addition to improving the conductivity of the intrinsically conductive polymer, excess dopant may also improve the physical properties of the intrinsically conductive polymer, such as suspension in a solution. In one embodiment, based on 100 parts by weight of the intrinsically conductive polymer, the content of the dopant is 10-1000 parts by weight. The intrinsically conductive polymer illustrated in the disclosure includes a doped mixture of an intrinsically conductive polymer and a dopant, such as PEDOT:PSS.

Ionic Salt Compound

The ionic salt compound contains anions and cations.

The anions adapted for the disclosure may be, for example, carboxylate ions (adipate, azelaate, 1,6-decanedicarboxylate, phthalate, maleate ion, benzoate ion, etc.), phosphate ion, borate ion, sulfonate ion, and the like.

The cations may include ammonium or amidinium and the like.

The ammonium adapted for the disclosure is not specifically limited if the ammonium is an ammonium that forms a salt with the anions. For example, the ammonium may be an unsubstituted ammonium, a primary ammonium (methylammonium, ethylammonium, propylammonium and isopropylammonium, etc.), a secondary ammonium (dimethylammonium, diethylammonium, methylethylammonium, methylpropylammonium and methylisopropylammonium, etc.), a tertiary ammonium (trimethylammonium, triethylammonium, tripropylammonium, dimethylethylammonium, dimethylpropylammonium and dimethylisopropylammonium, etc.) and a quaternary ammonium (tetramethylammonium, ethyltrimethylammonium, diethyldimethylammonium, triethylmethylammonium and tetraethylammonium, etc.), and so on.

The amidinium adapted for the disclosure is not specifically limited if the amidinium is an amidinium that forms a salt with the anions. For example, the amidinium may be an imidazolinium, a cation in which the hydrogen atom of imidazolinium is substituted with an alkyl group (1,2,3,4-tetramethylimidazolinium, 1,3,4-trimethyl-2-ethylimidazolinium, 1,3-dimethyl-2,4-diethylimidazolinium and 1,2-dimethyl-3,4-diethylimidazolinium, etc.), an imidazolium and a cation in which the hydrogen atom of imidazolium is substituted with an alkyl group (1,3-dimethylimidazolium, 1,3-Diethylimidazolium, 1-Ethyl-3-methylimidazolium and 1,2,3-trimethylimidazolium, etc.), and so on.

The composition ratio of cations and anions in the ionic salts is not specifically limited and can be adjusted according to requirements. For example, ionic salts may be composed of cations and anions in a molar ratio of 1:1.

The ionic salts may be used alone or in combination of two or more.

The content of the ionic salts is 0.1 to 50% by weight, for example, 1 to 25 and 1 to 20% by weight based on the total weight of the electrolyte solution.

Solvent

When in use, the ionic salts of the disclosure are required to be dissolved in a solvent. The atmospheric boiling point of an organic solvent may be greater than 100° C.

For example, the solvent adapted for the disclosure can be lactones, such as γ-butyrolactone; carbonate, such as ethylene carobonate (EC), propylene carbonate (PC), or a combination thereof; ethers, such as diethylene glycol dibutyl ether, polyethylene glycol, polypropylene glycol; ketones, such as methyl isobutyl ketone; alcohols, such as ethanol, ethylene glycol, or a combination thereof; an amide, such as carboxamide, acetamide, caprolactam, or a combination thereof; pyridine, such as pyridine; pyrrolidone, such as N-methylpyrrolidone; urethanes, such as dimethylurethane, tetramethylurethane, or a combination thereof; urea, such as tetramethyl urea; sulfone, such as sulfolane, ethyl methyl sulfone, and the like.

The solvent may be used alone or in combination of two or more.

The content of the solvent is not specifically limited and may be adjusted according to requirements. For example, the content of the solvent may be 0.1 to 99 parts by weight based on the total weight of the electrolyte solution.

Succinimide-Based Compound

The inventors of the disclosure find that adding a succinimide-based compound into the electrolyte solution may effectively reduce the impedance of the capacitor as well as maintaining the high capacitance of the capacitor.

The succinimide-based compound adapted for the disclosure may include, for example, N-hydroxysuccinimide and succinimide.

The succinimide-based compound may be used alone or in combination of two or more.

In an embodiment of the disclosure, based on 100 parts by weight of the ionic salt compound, the content of the succinimide-based compound in the electrolyte solution may be 0.1 to 300 parts by weight, for example, 1 to 300 parts by weight, 1 to 200 parts by weight, 1 to 100 parts by weight, 1 to 30 parts by weight, and the like.

Additive

Other compounds may also be added to the composition for the electrolytic capacitor of the disclosure to adjust the properties to meet various purposes. For example, crosslinked resins, such as epoxy resins, may be added to stabilize the electrolyte structure. A binder, such as PVP, may be added to improve the adhesion between the conductive polymer composite material and the capacitor electrode.

Other additives may include antioxidants, like pentascophenols; hydrogen scavengers; dielectric layer protectors, such as tributyl phosphate; ionic or nonionic surfactants, such as triton X-100, and the like.

Boron may not be included in the composition for the electrolytic capacitor of the disclosure.

Electrolytic Capacitor

FIG. 1 is a schematic view of an electrolytic capacitor according to an embodiment of the disclosure.

Referring to FIG. 1, according to the disclosure, a capacitor 100 includes a positive electrode 101, a negative electrode 102, a dielectric layer 103, and an electrolyte 104.

The positive electrode 101 may be aluminum, niobium, tantalum, titanium, zirconium, or an alloy thereof. The positive electrode 101 may have a sheet shape or a porous ingot shape obtained by sintering particles. According to requirements, the positive electrode 101 may be etched to increase the specific surface area.

The negative electrode 102 may be conductive silver paste, carbon paste, or metal foil (e.g., aluminum foil). The negative electrode 102 may be electrochemically etched to increase the specific surface area according to requirements. In some embodiments, other substances, such as carbon or titanium, may be attached to the surface of the aluminum foil to be the negative electrode 102 to increase its chemical stability or capacitance.

The dielectric layer 103 may be an oxide produced by oxidizing the positive electrode 101. For example, the positive electrode 101 (e.g., aluminum foil) may be treated by an electrochemical electrolysis reaction to form the dielectric layer 103 (e.g., aluminum oxide) on the positive electrode 101. The voltage applied in the electrochemical electrolysis reaction determines the thickness of the dielectric layer and the operating voltage of the capacitor as well as affects the electrostatic capacity of the capacitor. The higher the voltage of the electrochemical electrolysis reaction, the thicker the dielectric layer and the higher the working voltage of the capacitor, but the lower the electrostatic capacity. In other embodiments, the dielectric layer 103 may be formed by other methods, such as by sputtering inorganic oxides, organic-inorganic composites, or the foregoing multilayer structures on the positive electrode 101. The dielectric layer 103 may also be an organic compound dielectric layer, such as polyolefin, polyester, polyamide, and the like.

The capacitor of the disclosure may be wound, single-layer, or multi-layer stack structures. For example, a separator (not shown) is sandwiched between the positive electrode 101 and the negative electrode 102 and then wound into a solid electrolytic capacitor element. The capacitor may also be processed by stacking layers of multiple positive electrodes.

In some embodiments, the capacitor element may be treated with an aqueous organic acid such as oxalic acid or acetic acid to repair the damaged dielectric layer 103.

The intrinsically conductive polymer on the surface of dielectric layer of the capacitor may be distributed by an in-situ polymerization method or solution impregnation method.

In the in-situ polymerization method, the capacitor element is impregnated with a precursor of the intrinsically conductive polymer, and then the precursor is polymerized to form the intrinsically conductive polymer between the dielectric layer 103 and the negative electrode 102.

In the solution impregnation method, the polymerized intrinsically conductive polymer is dispersed in the solution, the capacitor element is impregnated in the solution, and the solvent is removed by increasing the temperature, so that the intrinsically conductive polymer is distributed between the dielectric layer 103 and the negative electrode 102.

In the disclosure, the precursor of the intrinsically conductive polymer or intrinsically conductive polymer dispersion solution may be added with additives, such as dimethyl sulfoxide (DMSO), PEG, glycerin, PVA, or a combination thereof according to requirements.

The intrinsically conductive polymer of the disclosure may be directly distributed on the dielectric layer of the capacitor. Alternatively, a single layer of or multiple layers of different substances, such as siloxane, polyethylene glycol, polyvinyl alcohol, and the like, may be added between the intrinsically conductive polymer and the dielectric layer according to requirements.

Then, the capacitor element containing the intrinsically conductive polymer is immersed in an electrolyte solution containing an organic solvent, an ionic salt compound, and a succinimide-based compound. The composition for the electrolytic capacitor is formed by impregnating the intrinsically conductive polymer with the electrolyte solution, that is, the electrolyte 104 located between the dielectric layer 103 and the negative electrode 102. After the impregnating step, the electrolytic capacitor is completed.

Embodiment

Embodiment 1 and Comparative Example 1

A separator paper was sandwiched between the positive aluminum foil of the alumina dielectric layer formed by the 50V electrochemical electrolysis reaction and the negative carbon foil electrochemically corroded in large surface area, which were then wound into a solid electrolytic capacitor element. The element might optionally repair the damaged alumina dielectric layer through the organic acid aqueous solution.

A PEDOT:PSS solution was prepared by mixing 8 g of aqueous solution containing 1.3 wt % PEDOT:PSS (PEDOT:PSS conductive grade, Sigma-Aldrich) and 0.5 g of dimethylsulfite, adjusted to pH 4.3 with ammonia water.

Then, after impregnating the element in the PEDOT:PSS solution, the temperature was increased to remove the solvent. During heating, the maximum temperature might reach 170° C. to ensure no solvent left. This impregnation and drying process were repeated twice to ensure that the conductive polymer mixture could fully fill the gaps of the dielectric layer.

Next, the element impregnated with PEDOT:PSS solution and dried was impregnated with the electrolyte solution in Table 1, then the capacitor was sealed with an aluminum case and a rubber cover, a current of 25V was applied at 135° C. for two hours, then the temperature was decreased to 125° C., and the capacitor was aged for 120 hours with the current continuously to obtain the electrolytic capacitor of the disclosure.

Property Evaluation

The aged capacitor was set aside at room temperature for 4 hours or more, and then the capacitance and equivalent series resistance (ESR) impedance were measured, the results were illustrated in Table 1.

TABLE 1

| | Electrolyte solution composition (wt %) | | | Capacitor property | |
|---|---|---|---|---|---|
| | 1,2,3,4-Tetramethyl-imidazolinium/ Phthalate Monoanion | N-Hydroxy-succinimide | Sulfolane | Capacitance (μF) | 100 kHz ESR (mΩ) |
| Embodiment 1-1 | 10 | 0.1 | 89.9 | 196.12 | 52.30 |
| Embodiment 1-2 | 10 | 0.5 | 89.5 | 197.08 | 39.34 |
| Embodiment 1-3 | 10 | 1 | 89.0 | 194.42 | 35.54 |
| Embodiment 1-4 | 10 | 2 | 88 | 190.68 | 48.62 |
| Comparative example 1-1 | 10 | — | 90.0 | 193.66 | 57.56 |

As shown in Table 1, compared to the capacitors of Comparative Example 1-1 using the electrolyte solution without succinimide, all the capacitors of Embodiment 1-1 to Embodiment 1-4 using an electrolyte solution in which the content of N-hydroxysuccinimide relative to the ionic salt compound was between 1 and 20 wt % had less equivalent series resistance (ESR) impedance, which supports that the impedance is effectively reduced when N-hydroxysuccinimide is included in the composition of the electrolyte solution.

Embodiment 2 and Comparative Example 2

The capacitors of Embodiment 2 and Comparative example 2 were prepared and evaluated in the same manner as those in Embodiment 1 in addition to the use of the electrolytic solutions of Table 2. The evaluation results were illustrated in Table 2.

TABLE 2

| | Electrolyte solution composition (wt %) | | | Capacitor property | |
|---|---|---|---|---|---|
| | Tripropyl-ammonium/ Phthalate Monoanion | N-hydroxy-succinimide | Sulfolane | Capacitance (μF) | 100 kHz ESR (mΩ) |
| Embodiment 2-1 | 10 | 0.5 | 89.5 | 198.78 | 34.10 |
| Embodiment 2-2 | 10 | 1 | 89.0 | 194.94 | 31.56 |
| Comparative example 2-1 | 10 | — | 90.0 | 201.90 | 38.36 |

Different ionic salts were used in Embodiment 2 and Comparative example 2. As shown in Table 2, even with different salts, compared to the capacitor of Comparative example 2-1 using the electrolyte solution without succinimide, the capacitors of Embodiment 2-1 and Embodiment 2-2 using the electrolyte solution containing N-hydroxysuccinimide still have less equivalent series resistance (ESR) impedance.

Embodiment 3 and Comparative Example 3

A separator paper was sandwiched between the positive electrode aluminum foil of the alumina dielectric layer formed by the 67V electrochemical electrolysis reaction and the negative electrode carbon foil electrochemically corroded in large surface area, which was then wound into a solid electrolytic capacitor element. The element may optionally repair the damaged alumina dielectric layer through the organic acid aqueous solution.

The PEDOT:PSS solution was prepared by mixing 8 g of an aqueous solution containing 1.3 wt % PEDOT:PSS (PEDOT:PSS conductive grade, Sigma-Aldrich) and 0.5 g of dimethyl sulfite, adjusted to pH 4.3 with ammonia water. Then, after impregnating the element in the PEDOT:PSS solution, the temperature was increased to remove the solvent. During heating, the maximum temperature might reach 170° C. to ensure no solvent left. This impregnation and drying process were repeated twice to ensure that the conductive polymer mixture can fully fill the gaps of the dielectric layer.

Next, the element impregnated with PEDOT:PSS solution and dried was impregnated with the electrolyte solution in Table 3, then the capacitor was sealed with an aluminum case and a rubber cover, a current of 35V was applied at 135° C. for two hours, then the temperature was decreased to 125° C., and the capacitor was aged for 120 hours with the current continuously to obtain the electrolytic capacitor of the disclosure.

Property Evaluation

The aged capacitor was set aside at room temperature for 4 hours or more, and then the capacitance and equivalent series resistance (ESR) impedance were measured, the results were illustrated in Table 3.

TABLE 3

| | Electrolyte solution composition (wt %) | | | Capacitor property | |
|---|---|---|---|---|---|
| | 1,2,3,4-Tetramethyl-imidazolinium/ Phthalate Monoanion | Succinimide | Sulfolane | Capacitance (μF) | 100 kHz ESR (mΩ) |
| Embodiment 3 | 10 | 10 | 80.0 | 124.26 | 31.99 |
| Comparative example 3 | 10 | — | 90.0 | 125.46 | 35.77 |

As shown in Table 3, even if N-hydroxysuccinimide was replaced by succinimide, compared to the capacitor of Comparative example 3 using the electrolyte solution without succinimide, the capacitor of Embodiment 3 using the electrolyte solution containing succinimide had less equivalent series resistance (ESR) impedance.

Embodiment 4 and Comparative Example 4

The capacitors of Embodiment 4 and Comparative example 4 were prepared and evaluated in the same manner as those in Embodiment 3 in addition to the use of the electrolytic solutions of Table 4. The evaluation results were illustrated in Table 4.

TABLE 4

| | Electrolyte solution composition (wt %) | | | Capacitor property | |
|---|---|---|---|---|---|
| | 1,2,3,4-Tetramethyl-imidazolinium/ Phthalate Monoanion | Succinimide | γ-butyrolactone | Capacitance (μF) | 100 kHz ESR (mΩ) |
| Embodiment 4 | 10 | 20 | 70 | 123.92 | 36.00 |
| Comparative example 4 | 10 | — | 90 | 123.42 | 43.38 |

As shown in Table 4, even if the solvent was changed from sulfolane to γ-butyrolactone, compared to the capacitor of Comparative example 4 using the electrolyte solution without succinimide, the capacitor of Embodiment 4 using the electrolyte solution containing succinimide had less equivalent series resistance (ESR) impedance.

Comparative Example 5

The capacitor of Comparative example 5 was prepared and evaluated in the same manner as those in Embodiment 3 in addition to the use of the electrolytic solutions of Table 5. The evaluation results were illustrated in Table 5.

TABLE 5

| | Electrolyte solution composition (wt %) | | | Capacitor property | |
|---|---|---|---|---|---|
| | 1,2,3,4-Tetramethyl-imidazolinium Phthalate | Maleimide | Sulfolane | Capacitance (μF) | 100 kHz ESR (mΩ) |
| Comparative example 5 | 10 | 10 | 80.0 | 123.17 | 55.72 |

As shown in Table 5, if the succinimide-based compound in the electrolyte solution was replaced by maleimide, the equivalent series resistance (ESR) impedance was significantly increased compared with that of Embodiment 3 using succinimide. This result indicates that not every imide can achieve the same effect of reducing the equivalent series resistance (ESR) impedance as succinimide.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A composition for an electrolytic capacitor, comprising: an intrinsically conductive polymer, and an electrolyte solution comprising an organic solvent, an ionic salt compound, and a succinimide-based compound.

2. The composition for the electrolytic capacitor according to claim 1, wherein based on 100 parts by weight of the ionic salt compound, the succinimide-based compound of 1 to 300 parts by weight is contained in the electrolyte solution.

3. The composition for the electrolytic capacitor according to claim 1, wherein based on 100 parts by weight of the ionic salt compound, the succinimide-based compound of 1 to 200 parts by weight is contained in the electrolyte solution.

4. The composition for the electrolytic capacitor according to claim 1, wherein the succinimide-based compound is N-hydroxysuccinimide or succinimide.

5. The composition for the electrolytic capacitor according to claim 1, wherein the intrinsically conductive polymer comprises polyaniline, polypyrrole, polythiophene, poly(p-phenylene vinylene), polyphenylene sulfide, a derivative thereof, or a combination thereof.

6. The composition for the electrolytic capacitor according to claim 1, wherein the intrinsically conductive polymer is an intrinsically conductive polymer in a doped state.

7. The composition for the electrolytic capacitor according to claim 6, wherein the intrinsically conductive polymer in the doped state is poly(3,4-ethylenedioxythiophene): poly(p-styrenesulfonic acid) (PEDOT:PSS) or a derivative thereof.

8. The composition for the electrolytic capacitor according to claim 1, wherein the ionic salt compound comprises anions and cations, wherein the anions comprise carboxylate ion, phosphate ion, or borate ion, and the cations comprise ammonium or amidinium.

9. The composition for the electrolytic capacitor according to claim 8, wherein the cation is 1,2,3,4-tetramethylimidazolinium or tripropylammonium, and the anion is phthalate monoanion.

10. The composition for the electrolytic capacitor according to claim 1, wherein the solvent comprises γ-butyrolactone, sulfolane, or a combination thereof.

11. An electrolytic capacitor, comprising:
a positive electrode;
a dielectric layer disposed on the positive electrode;
a negative electrode; and
an electrolyte located between the dielectric layer and the negative electrode,
wherein the electrolyte comprises the composition for the electrolytic capacitor according to claim 1.

* * * * *